March 14, 1967     H. C. SAUER     3,308,703
CUTTER FOR GROOVING RUBBER
Filed Oct. 13, 1965
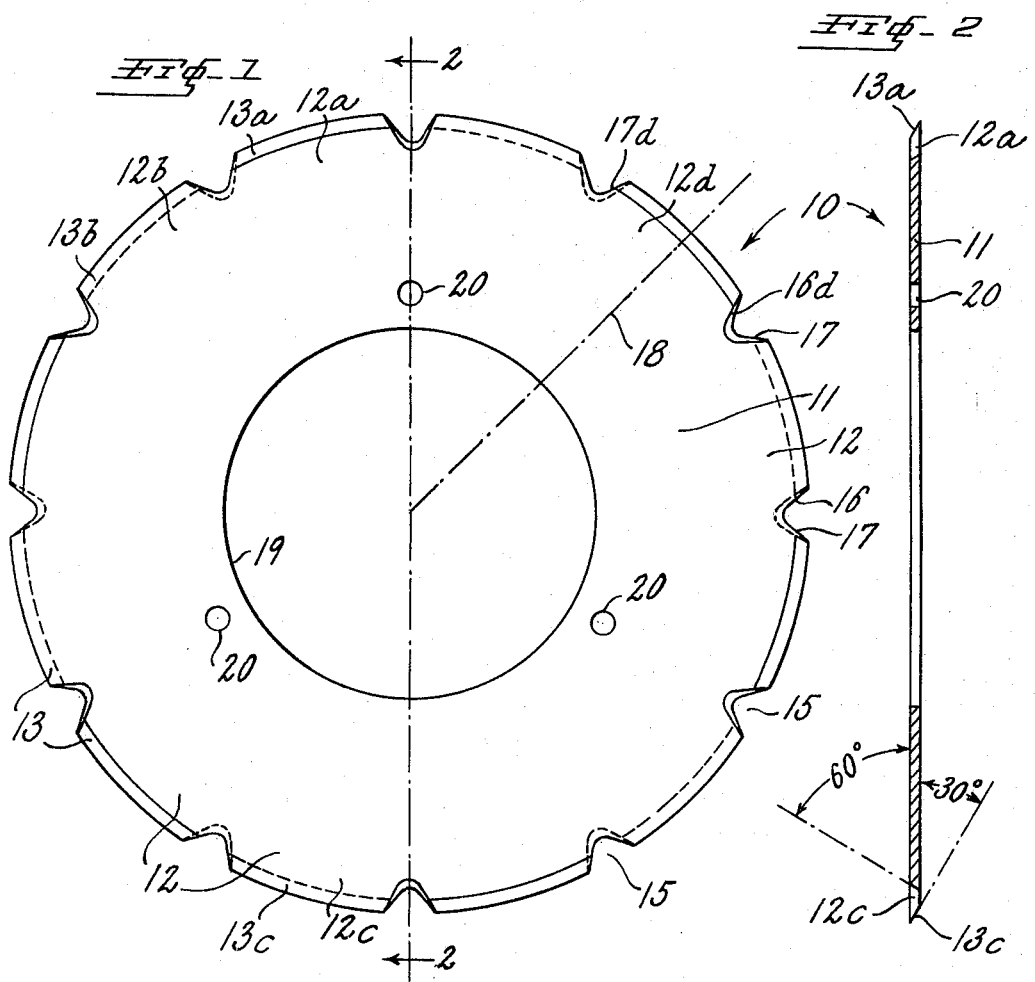
INVENTOR.
HERMAN C. SAUER
BY James R. Hulen
ATTORNEY

United States Patent Office 3,308,703
Patented Mar. 14, 1967

3,308,703
CUTTER FOR GROOVING RUBBER
Herman C. Sauer, Ambler, Pa., assignor to United States Rubber Company, New York, N.Y., a corporation of New Jersey
Filed Oct. 13, 1965, Ser. No. 495,630
3 Claims. (Cl. 83—676)

This invention relates to cutters and, more particularly, to circular cutters for grooving uncured rubber and rubber-like materials.

The present invention has particular utility when used with the invention described and claimed in applicant's copending United States patent application Ser. No. 419,092, filed on Dec. 17, 1964.

In the belt molding method of the aforementioned application, a cylindrically shaped uncured endless rubber carcass having a layer of helically wound cord below the outer surface thereof must be circumferentially grooved at spaced locations. The grooving operation also accomplishes the removal of portions of the cord that are located within the grooved areas of the carcass. Since the remaining convolutions of the cord layer provide the tension members for finished power transmission belts, it is essential that the ends of the severed cord not be ripped out of the body of the belt rubber or otherwise distorted.

In experimenting with conventional cutters and saw blades, it was found that those that effectively grooved the rubber were ineffective in the removal of the cord. Likewise, a narrow faced emery wheel was found to be effective for cord removal but gummed up in a relatively short time from the soft uncured rubber. No prior devices were found to be effective for both grooving the uncured rubber and removing the tension cord. As used herein the term "rubber" is intended to include natural rubber, synthetic rubbers and other elastomeric materials that have a soft, sticky quality in the uncured condition.

Accordingly, it is an object of this invention to provide a cutter for grooving uncured rubber and removing cords or other materials located below the surface of the rubber.

A further object is to provide a circular cutter that will sever and remove portions of helically wound cord located below the surface of uncured rubber without ripping out the severed ends of the cord.

A still further object is to provide a circular cutter that will groove uncured rubber regardless of the softened condition of the rubber.

A still further object is to provide a circular cutter for grooving uncured rubber, which cutter may be rotated in either direction with equal effectiveness.

These and other objects are accomplished in accordance with this invention which comprises a circular blade having a plurality of teeth located around the periphery thereof, the top edges of the teeth being beveled with alternate teeth having oppositely directed bevels, each of said teeth having at least one side cutting edge formed by a gullet which separates adjacent teeth, the cutting edges being beveled with alternate cutting edges having oppositely directed bevels, and the cutting edges being inclined in a direction away from the direction of rotation of the blade.

For a better understanding of the present invention together with other and further objects thereof, reference is made to the following description, taken in connection with the accompanying drawing, and its scope will be pointed out in the appended claims Referring now to the drawing:
FIG. 1 is a side elevational view of the circular blade; and
FIG. 2 is a sectional view taken along line 2—2 of FIG. 1.

Referring now to the drawing, cutter 10 is constructed from a thin circular blade 11. The width of blade 11 is governed only by the width of groove desired in the uncured rubber and the type of tension cord utilized in the construction of the power transmission belts. As stated before, this cutter has its greatest utility when used with the invention described and claimed in applicant's copending application Ser. No. 419,092. In the aforementioned application, a plurality of cutters are used to groove and remove portions of cord from the rear surface of a rubber belt carcass. Since the cutters are relatively closely spaced, it is desirable that each cutter be as narrow as possible and yet wide enough to remove the desired amount of cord.

A plurality of teeth 12 are located around the periphery of blade 11 and alternate teeth are provided with top cutting edges 13 that are beveled in opposite directions. For example, tooth 12a has a top edge 13a beveled in one direction and tooth 12b has a top edge 13b beveled in an opposite direction. This is better illustrated in FIG. 2 wherein tooth 12a is shown in cross section and the top cutting edge 13a of the tooth is located at the right of blade 11 with the bevel extending downwardly to the left. Whereas, tooth 12c shown in cross section at the bottom of blade 11, which tooth corresponds to tooth 12b adjacent tooth 12a, has a top cutting edge 13c that appears on the left of blade 11 and is beveled upwardly toward the right of the blade.

Teeth 12 are separated by a plurality of gullets 15 that form side cutting edges 16 and 17 for adjacent teeth 12. Side cutting edges 16 and 17 formed by alternate gullets 15 are also provided with bevels that extend in opposite directions. Gullets 15 are formed in such a manner that each tooth 12 has a side cutting edge 16 and a side cutting edge 17, each of which slants toward the centerline of the tooth. For example, tooth 12d has a centerline 18 formed by a radius of blade 11 that passes through the central portion of the tooth. Both side cutting edges 16d and 17d slant radially outwardly in a direction toward centerline 18.

As a result of the above-described construction, the side cutting edges 16, which perform the cutting operation when blade 11 is rotated in a clockwise direction (as viewed in FIG. 1), slant rearwardly in a direction opposite to the direction of rotation. Similarly, side cutting edges 17 slant rearwardly when blade 11 is rotated in a counterclockwise direction. This construction is critical to the intended use of cutter 10 because it provides a cutting surface which will not only groove the uncured rubber but will remove portions of cord lying below the surface of the rubber without tearing the severed ends of the cords. Also, because of the symmetrical construction of blade 11, it is possible to rotate the blade in either direction and to thereby prolong the life of the cutting edges.

The degree of the bevel on the top and side edges of teeth 12 is not critical to the operation of the cutter, however, it has been found that a bevel of 30° on the top cutting edge 13 and a bevel of 60° on the side cutting edges 16 and 17 results in a blade construction that smoothly grooves the uncured rubber and removes portions of the cord lying below the surface of the rubber.

Blade 11 is also provided with a central opening 19 for receiving a rotatable spindle (not shown) and three evenly spaced apertures 20 for receiving rods which secure the blade against rotation on the spindle.

It will be apparent from the foregoing description that the present invention provides a unique blade construction for grooving uncured rubber and severing cord located below the surface of the rubber. These two materials, uncured rubber and cord, are two vastly different materials, thus, a unique cutter construction is required for accomplishing the desired results of grooving and cord removal.

This unique construction is provided in the present invention which comprises a circular blade having a plurality of teeth around the periphery thereof, alternate ones of said teeth having bevels extending in opposite directions, and side cutting edges formed by gullets which separate the teeth. The side cutting edges are also oppositely beveled and slanted toward the centerline of the tooth and, consequently, regardless of the rotation of the blade, the side cutting edge is outwardly slanted in a direction opposite to the direction of rotation.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true scope and spirit of the invention.

Having thus described my invention, what I claim and desire to protect by Letters Patent is:

1. A cutter for grooving uncured rubber and removing material located below the surface of said rubber, comprising: a circular blade having a plurality of teeth located around the periphery thereof, the top cutting edges of said teeth being beveled with alternate teeth having oppositely directed bevels, each of said teeth having at least one side cutting edge formed by a gullet which separates adjacent teeth, said side cutting edges being beveled with alternate cutting edges having oppositely directed bevels, and said cutting edges being slanted radially outwardly in a direction away from the direction of rotation of said blade.

2. A cutter for grooving uncured rubber and removing material located below the surface of said rubber, comprising: a circular blade having a plurality of teeth located around the periphery thereof, the top cutting edges of said teeth being beveled with alternate teeth having oppositely directed bevels, each of said teeth having two side cutting edges formed by gullets that separate adjacent teeth, said side cutting edges being beveled with the cutting edges on each tooth having oppositely directed bevels, and both of said side cutting edges on each tooth being slanted radially outwardly toward the centerline of said tooth, so that each of said teeth will have a rearwardly inclined side cutting edge regardless of the direction of rotation of said blade.

3. The cutter of claim 2 wherein said top cutting edges are beveled at an angle of 30° and said side cutting edges are beveled at an angle of 60°.

References Cited by the Examiner
UNITED STATES PATENTS

| | | | |
|---|---|---|---|
| 39,176 | 5/1873 | Miller | 83—676 |
| 147,335 | 2/1874 | Lothrop | 143—133 |
| 352,624 | 11/1886 | Loughlin | 143—133 |
| 1,246,905 | 11/1917 | Garlock et al. | 143—133 |

WILLIAM W. DYER, JR., *Primary Examiner.*

J. M. MEISTER, *Examiner.*